United States Patent [19]

Hirsch

[11] Patent Number: 4,936,019
[45] Date of Patent: Jun. 26, 1990

[54] TEMPLATE FOR PRODUCING CUTOUTS IN STRAPS

[75] Inventor: Hermann Hirsch, Klagenfurt, Austria

[73] Assignee: Hirsch Armbander Gesellschaft m.b.H., Klagenfurt, Austria

[21] Appl. No.: 282,253

[22] Filed: Dec. 9, 1988

[30] Foreign Application Priority Data

Jul. 4, 1988 [DE] Fed. Rep. of Germany ....... 8808558

[51] Int. Cl.$^5$ .............................................. B27C 5/10
[52] U.S. Cl. ..................................................... 33/562
[58] Field of Search .................. 224/164, 178; 33/562; 368/282

[56] References Cited

FOREIGN PATENT DOCUMENTS 252634 2/1967 Austria .
0199708 10/1986 European Pat. Off. .
0097638 12/1986 European Pat. Off. .

*Primary Examiner*—Harry N. Haroian
*Attorney, Agent, or Firm*—Young & Thompson

[57] ABSTRACT

Template (1, 30, 40) for producing one or several cutouts (14, 15) in straps and in ends (12) of watchbands (10) to be attached to a watch (20), especially in ends that have been formed into loops (11). The template (1, 30, 40) exhibits at least one indentation (2, 3, 4, 31, 32, 50) for receiving the end (12) of the watchband (10) to be provided with cutouts (14, 15). At least one slot (5, 6) is arranged in the template (1, 30, 40) in the zone of the indentation (2, 3, 4, 31, 32, 50) for the engagement (16) of a punch (13) having, for example, the shape of pliers. Several slots (5, 6) are provided in side-by-side relationship. The slots (6) can be provided in the zone of the lateral rims of the watchband (10). The indentation (2, 3, 4, 31, 32, 50) in the template (1, 30, 40) can exhibit, besides the slots (5, 6) upwardly oriented stops (8, 44) for the end of the watchband (10) at the frontal side.

12 Claims, 3 Drawing Sheets

TEMPLATE FOR PRODUCING CUTOUTS IN STRAPS

The invention relates to a template for producing one or several cutouts in straps and in ends of watchbands to be attached to a watch, especially in ends that have been formed into loops.

It is known to bend watchbands, at their ends to be attached to a watch casing, into a loop accommodating a stem, e.g. a spring pin, to be connected with the watch connecting flanges. Such watchbands have been known from Austrian Patent No. 252,634. It is also known to form eyes in watchbands, for example in a synthetic resin portion of the watchband, by way of which the watchbands can be connected to the casing of a watch (cf. EP-A-Nos. 97 638 and 199 708).

Watch casings have also been known which comprise projections engaging into slots in the ends of watchbands to be attached to the watch casing These watch casings ordinarily also include connecting means in lateral contact with the end of the watchband. Such hinge-type connections between watchband and watch casing are provided, for example, in the watches known as "swatch" watches.

The invention is based on the object of indicating a template of the type discussed above which can be used for producing, in the end of the watchband to be attached to the watch, the necessary cutouts for the hinge-type connection between the strap (watchband) and a component (watch casing).

According to the invention, this object has been attained by providing that the template has at least one indentation for receiving the end of the watchband to be provided with cutouts, and that at least one slot is arranged in the template in the zone of the indentation for the engagement of a punching tool that has, for example, the shape of pliers.

By means of the template according to this invention, it is possible for a watch tradesman, for example, to produce the cutouts required for the connection in a fast, accurate and simple fashion immediately before attaching a watchband to a watch, for instance when replacing watchbands, no matter whether the watchband involved is one with a finished eye or one with an end that must be bent into a loop ("adhesive watchband"). Therefore, with the use of the template according to this invention, it is possible to attach any desired watchbands of leather or of combinations of leather and plastic, or bands that consist solely of plastic, all of which are optionally made of several layers, to watches by way of a connection fashioned in the manner of a hinge.

Additional details and features of the invention can be seen from the dependent claims and from the following description of the embodiments illustrated, in part schematically, in the appended drawings wherein:

Figure 1:
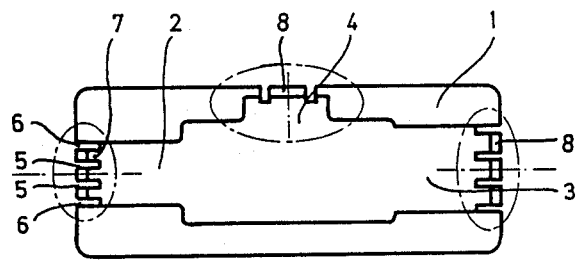
FIG. 1 shows a template in a top view.
Figure 2:
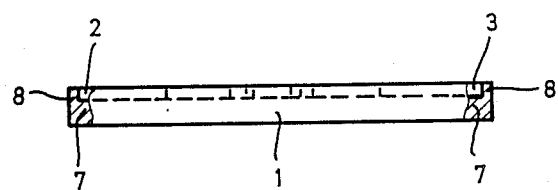
FIG. 2 shows, partially in section, the template of FIG. 1 in a lateral view.
Figure 6A:
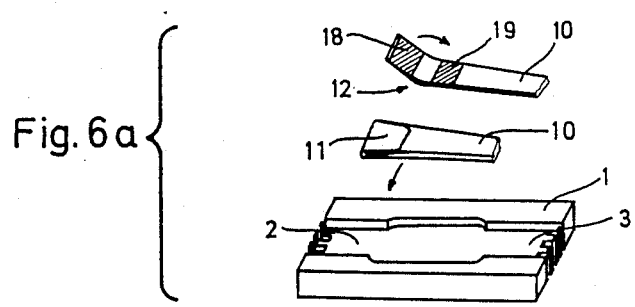
Figure 6B:
Figure 6C:
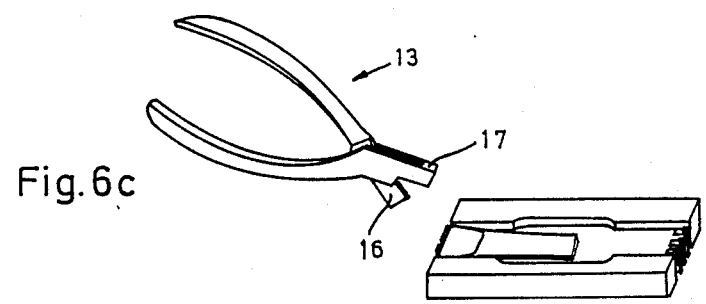
Figure 6D:
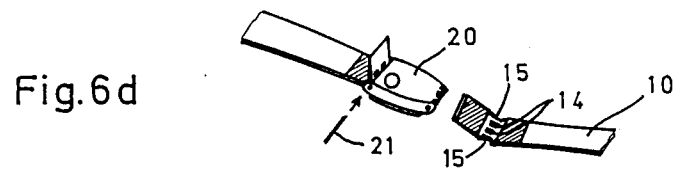
Figure 6E:
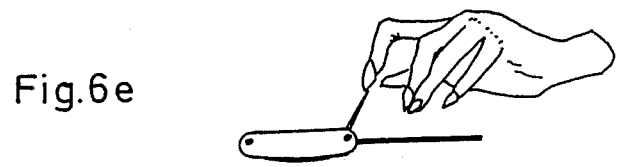
Figure 6F:
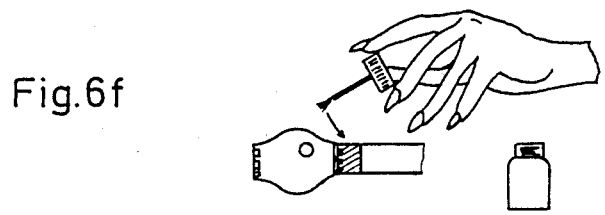
Figure 6G:
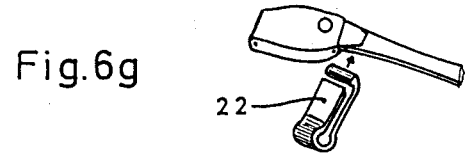
Figure 7:
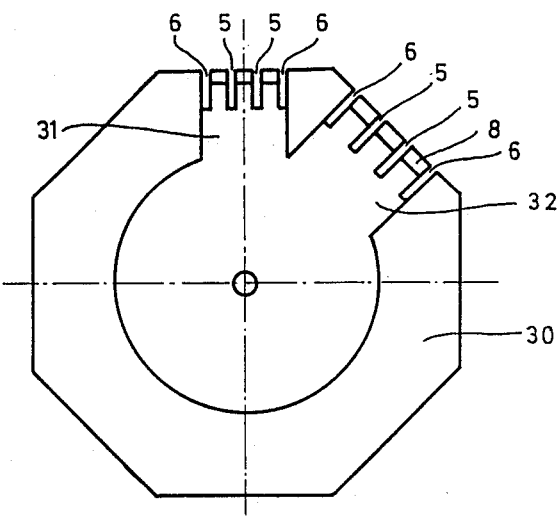
Figure 8:
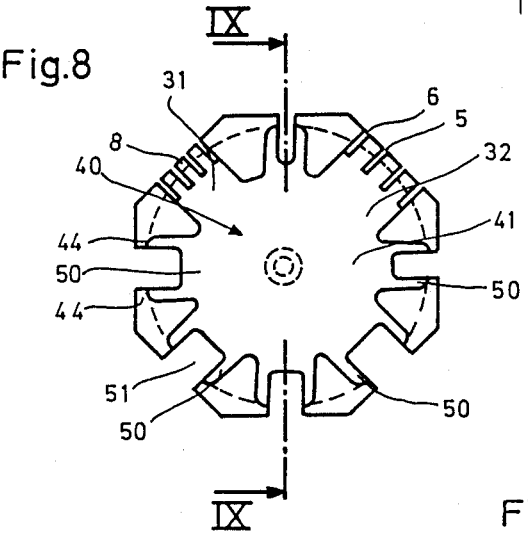
Figure 10:
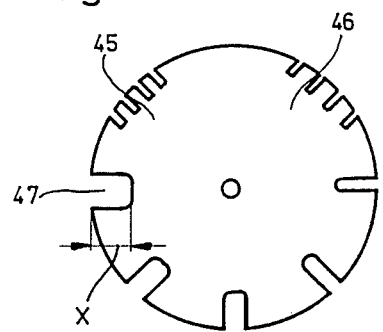
Figure 9:
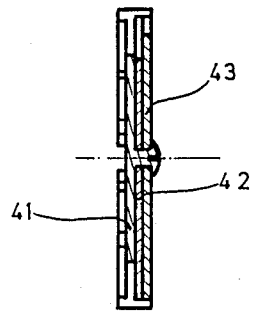
Figure 11:
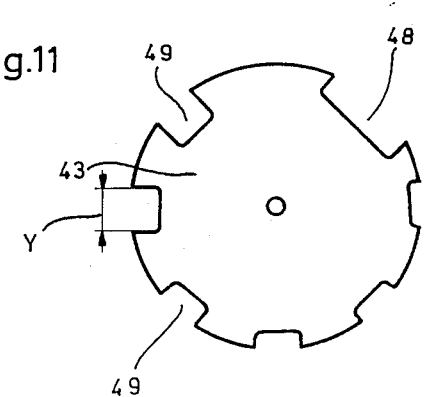

FIG. 6 shows the working steps when using the template of this invention according to FIG. 1, FIG. 7 shows another embodiment of a template according to this invention, FIG. 8 shows a third embodiment of a template according to this invention, FIG. 9 shows a section along line IX—IX in FIG. 8, FIG. 10 shows a component of the template according to FIG. 8, FIG. 11 shows a further component of the template of FIG. 8, FIG. 12 shows a fourth embodiment of a template according to the invention, and FIG. 13 is a section on the line XIII—XIII in The template 1 illustrated in FIG. 1 is a substantially rectangular plate of metal or a synthetic resin, exhibiting three indentations 2, 3 and 4 for the accommodation of the end of a watchband or some other strap to be provided with cutouts. In the zone of the indentation 2, two slots 5 are arranged, and two additional slots 6 are located at the rim of the indentation 2. The webs 7 disposed between the slots 5 and 6 have at their free ends upwardly oriented stops 8 for the frontal end of the watchband to be provided with cutouts.

Also in the region of the two other indentations 3 and 4, slots 5 and 6 (indentation 3) and, respectively, only slots 5 (indentation 4) are provided.

Figure 3:
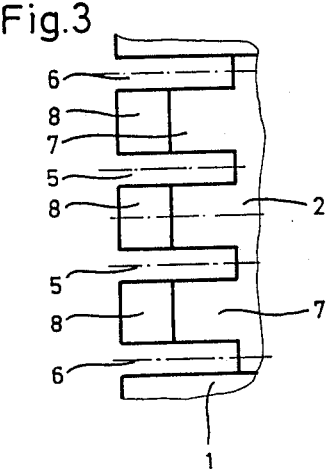
FIGS. 3, 4 and 5 show details of the template of FIG. 1 on an enlarged scale.
Figure 4:
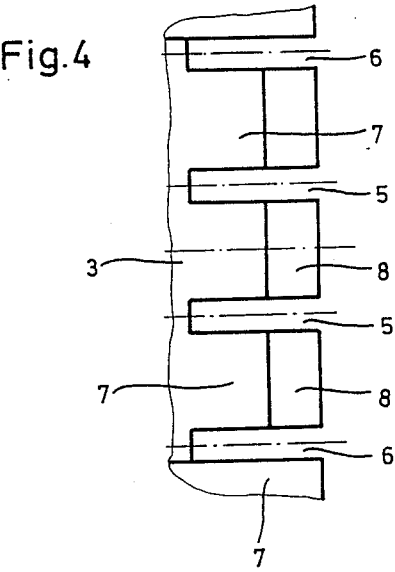
Figure 5:
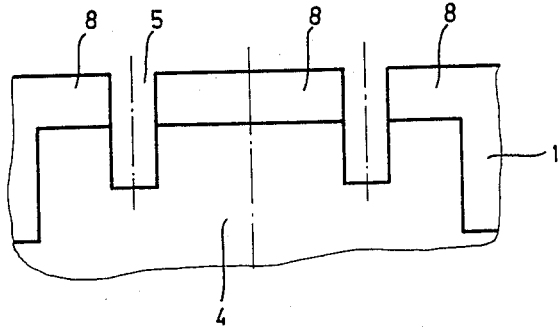

It can be seen from FIG. 1 and from FIGS. 3 and 4 that the slots 6 are oriented in the zone of the longitudinal lateral rims of the watchband to be equipped with cutouts so that, during the punching step, the lateral rims are cut in the region of the slots 6 so that two surfaces are formed extending essentially in the longitudinal direction of the watchband, these surfaces fitting in between the two external projections of a hinge-like arrangement at a watch casing.

The use of the template 1 illustrated in FIGS. 1 through 5 for attachment of a watchband 10 having an end 12 to be formed into a loop 11 will be described hereinbelow with reference to FIGS. 6a to 6g (cf. FIG. 6a). The end 12 of the watchband 10 is inserted, as shown in FIG. 6b, with the end folded over into the indentation 2 of the template 1. Then, with the aid of the punch 13 shown in FIG. 6c, there are produced, as indicated in FIG. 6c, in the zone of the slots 5 of indentation 2 two cutouts 14 that are only open toward the front with the end 12 of the watchband 10 being folded over into a loop 11, and also, in the zone of the slots 6 of the indentation 2, two cutouts 15 are formed which are arranged in the zone of the lateral rims of the watchband 10 and are open toward the front and toward the side. For this purpose, a projection 16 (punching die) of the punch 13 is introduced in succession in the slots 5 and 6, and the pliers 13 are closed, the holddown member 17 thereof being in contact from above with the end 12 of the watchband 10 formed into the loop 11. The end 12 of the watchband 10, thus provided with cutouts 14 and 15, is shown in FIG. 6d. This end is then brought into engagement with the watch casing 20 (FIG. 6d) in such a way that the webs remaining between the cutouts 14 and 15 of the watchband 10 engage into the recesses between the projections at the watch casing 20. Thereupon, a pin 21 is placed into the bores in the projections of the watch casing 20 and, as illustrated in FIG. 6e, the loop is pulled taut by exerting a slight pull on the end 12 of the watchband 10 to be bent back, and the cutouts 14 and 15 are brought into the correct position with respect to the watch casing 20.

As the last step, as indicated in FIGS. 6f and 6g, the adhesive is activated in the zones 18 and 19 of the watchband 10 (FIG. 6a), the loop 11 is closed and fixed in place with the aid of a clamp 22 until the adhesive bond has been established.

The template 30 shown in FIG. 7 is of an octagonal shape and has two indentations 31, 32 of differing width, the slots 5 and 6 in the zone of these recesses 31, 32 being likewise differently arranged. The use of the template 30 corresponds to the use of template 1, as explained with reference to FIGS. 6a through 6g.

The template 40 illustrated in FIGS. 8–10 is likewise of octagonal shape and consists of three disks 41, 42 and 43. In the disk 41 of template 40, indentations 31 and 32, fashioned similarly to the indentations 31, 32 of template 30, are provided first of all.

In the disk 41 of template 40, six additional indentations 50 are arranged which can be of differing width and emanate from an indentation located in the center of the disk 41. In the zone of each indentation 50, recesses 51 are provided in the disk 41. At the end of each indentation 50 on the rim side, stops 44 are provided for the radial alignment of the end 12 of the watchband 10 to be equipped with cutouts. The recesses 51 can have differing widths, as indicated in FIG. 8.

The disk 42 is rotatably connected to the disk 41 and has, in zones 45 and 46, slots corresponding to the slots 5 and 6 of indentations 31 and 32. Furthermore, recesses 47 are provided in the disk 42, all having the same radial dimension x, but exhibiting differing widths.

In the third disk 43 of template 40, recesses 49 are provided, all of which have the identical width y but exhibit differently large radial dimensions. Also, the disk 43 has a recess 48 which, by rotating the disk 43 with respect to the disk 41, is brought into the zone of the indentations 31 and 32 and, respectively, of the slots 5 and 6 provided at that location, if cutouts are to be produced in watchbands with the use of the indentations 31 and 32, respectively.

The three disks 41, 42 and 43 of the template 40 can be rotated with respect to one another, but they are equipped with locking means, e.g. protrusions engaging into depressions in the disks, not shown, these locking means securing the disks while the three disks 41, 42, 43 of the template 40 are, for example, in the rotated position shown in FIG. 8. In this way, the disks are secured against mutual rotation when any one of the recesses 47 is aligned with respect to any one of the recesses 49, and these two are aligned with respect to any one of the recesses 51 of the disk 41.

The use of the template 40 with respect to its indentations 31 and 32 corresponds to the template 30 and the template 1, respectively.

The recesses 51 and the cutouts 47 and 49, however, serve for producing, in the ends 12 of watchbands 10, differently broad and/or differently deep cutouts. For this purpose, the punch 13 shown in FIG. 6c can be utilized, by operating this punch repeatedly; the area wherein the punch can be engaged is defined in the width (transversely to the band) as well as in the depth (in the band direction) by the combination of one of the recesses 51 with respectively one of the cutouts 47 and 49.

The template 52 shown in FIGS. 12 and 13 is a modified embodiment of the template 40 illustrated in FIGS. 8 through 11. The template 52 likewise consists of disks 41, 42 and 43. For a better handling of the template 52, a turning handle member 53 extending through the disk 43 is connected with the disk 42, for example pressed into the latter. A turning handle member 54 is connected to the disk 43 in a similar manner as the turning handle member 53 with the disk 42.

The disk 43 is rotatably mounted, by way of the turning handle member 54, at the turning handle member 53, and the latter is rotatably mounted via the disk 42 at the disk 41.

Slots 55 are arranged in the disk 41, and holes 56 are provided in the disk 42, superimposed in every in use position of the template 52. The number of slots 55 and of holes 56 corresponds in each case to the number of indentations 31, 32 and 50.

Code markings are arranged on the disk 41 in the zone of slots 55 on the surface 57, corresponding to the indentations 31, 32 and 50, respectively. Likewise, code markings corresponding to the recesses in the disk 42 are provided on the surfaces 58 of the disk 42 visible through the slots 55, and code markings corresponding to the recesses in the disk 43 are located on the surfaces 59 on the disk 43, visible through the slots 55 and the holes 56.

By matching the individual code markings on the disks 41, 42 and 43, it is possible in a simple way to set a combination of specific cutouts in the disks 41, 42 and 43.

What is claimed is:

1. Template (1, 30, 40) for producing one or several cutouts (14, 15) in straps and in ends (12) of watchbands (10) to be attached to a watch (20), especially in ends that have been formed into loops (11), characterized in that the template (1, 30, 40) exhibits at least one indentation [2, 3, 4, 31, 32, 50) for receiving the end (12) of the watchband (10) to be provided with cutouts (14, 15); and that at least one slot (5, 6) is arranged in the template (1, 30, 40) in the zone of the indentation (2, 3, 4, 31, 32, 50) for the engagement (16) of a punch (13) having, for example, the shape of pliers.

2. Template according to claim 1, characterized in that several slots (5, 6) are provided in side-by-side relationship.

3. Template according to claim 1, characterized in that the indentation (2, 3, 4, 31, 32, 50) in the template (1, 30, 40) exhibits, besides the slots (5, 6), 4. Template according to claim 1, characterized in that the template (1, 30) is fashioned as a substantially planar plate, indentations (2, 3, 4, 31, 32) being provided on at least two sides of this plate for the accommodation of differently wide watchbands (10).

5. Template according to claim 1, characterized in that several indentations (2, 3, 4, 31, 32) are provided in the template (1, 30, 40) for the accommodation of watchbands (10) having differently arranged slots (5, 6).

6. Template according to claim 1, characterized in that the template (40) has a polygonal disk (41) provided with one or several, preferably differently wide indentations (31, 32, 50) for accommodation of the watchband (10); that a second disk (42) is connected with the disk (41), this second disk being rotatable with respect to the disk (41) exhibiting the indentations (31, 32, 50); and that the slots (45, 46, 47) for the engagement (16) of the punch (13) are provided in the second disk.

7. Template according to claim 6, characterized in that indentations (50) for watchbands (10) of differing width are provided in the first disk (41), distributed over the periphery of the latter; and that, in the zone of one portion of the indentations (50), slots (5, 6) opening toward the rim of the disk [41) or recesses 1) opening 8. Template according to claim 6, characterized in that there are provided, in the second disk (42), groups (45, 46) of differently arranged slots and cutouts (47) for the production of broader cutouts at the ends of the watchbands (10).

9. Template according to claim 8, characterized in that the cutouts (47) exhibit differing widths, but the same radial dimension (x).

10. Template according to claim 6, characterized in that the third disk (43) is connected with the first disk (41) and the second disk (42) and is rotatable with respect to the first and second disks, and that recesses (48, 49) having differently large radial dimensions are provided in the third disk (43).

11. Template according to claim 6, characterized in that the disks (41, 42, 43) are provided with locking means releasably retaining the disks (41, 42, 43) in positions wherein the indentations 31, 32, 50) in one disk (41) are aligned with respect to the slots (45, 46) and, respectively, the recesses (47) in the second disk (42) and optionally with respect to the recesses (48, 49) in the third disk (43).

12. A template according to claim 1, characterized in that said slots (6) are disposed in that portion of the template (1, 30, 40) which is adjacent the lateral edges of the watchband (10) when said end (12) of the watchband (10) is disposed in said at least one indentation (2, 3, 4, 31, 32, 50).

* * * * *